Jan. 5, 1943.  K. A. BROWNE  2,307,566
PNEUMATIC DRIVE FUEL PUMP
Filed July 31, 1940  3 Sheets-Sheet 1

INVENTOR
KENNETH A. BROWNE.
BY
ATTORNEY

Jan. 5, 1943.   K. A. BROWNE   2,307,566
PNEUMATIC DRIVE FUEL PUMP
Filed July 31, 1940   3 Sheets-Sheet 2

INVENTOR
KENNETH A. BROWNE.
BY
ATTORNEY

Jan. 5, 1943.    K. A. BROWNE    2,307,566
PNEUMATIC DRIVE FUEL PUMP
Filed July 31, 1940    3 Sheets-Sheet 3

INVENTOR
KENNETH A. BROWNE.
BY
ATTORNEY

Patented Jan. 5, 1943

2,307,566

UNITED STATES PATENT OFFICE 2,307,566

PNEUMATIC DRIVE FUEL PUMP

Kenneth A. Browne, Fairlawn, N. J., assignor to Wright Aeronautical Corporation, a corporation of New York Application July 31, 1940, Serial No. 348,735

10 Claims. (Cl. 103—152)

This invention relates to fluid pumps, and is concerned particularly with a self-contained double acting pump for light liquids adapted to be driven by compressed air or by means of a vacuum pump. The particular pump hereinafter disclosed in detail is adapted for use in aircraft and, to obtain a picture of the utility of this invention the position of the pump with respect to an aircraft engine fuel system will be briefly described.

In the normal aircraft, the fuel tanks are disposed at a substantial distance from the engines and ordinarily a fuel pump mounted on and driven by the engine picks up liquid fuel from a line connected to the tank and delivers same under moderate pressure to the engine. At extremely high altitude atmospheric pressure, of course, becomes low, and this low atmospheric pressure when acting upon the fuel in the tanks may make fuel delivery from the tank to the engine pump difficult unless there be a substantial gravity head of fuel on the pump suction and unless the fuel line from the tank to the pump be quite large and free of any obstructions which would tend to restrict the free passage of fuel. Accordingly, for high altitude aircraft, the use of either a main pump or booster pump at the fuel tanks is indicated to overcome long fuel lines under very low pressure. If such a pump is used it will be disposed directly at the tank outlet and will boost the fuel pressure in the line from the tank to the engine to such an extent that free flow will be assured, and that vapor lock will be inhibited. One of the problems in installing a fuel pump at the tank outlet consists in the difficulty of carrying power thereto—electrically driven centrifugal pumps might be used and also variable speed hydraulic pumps might be used, but both systems would tend to be unduly heavy and would have drawbacks in necessitating relatively complex control equipment to maintain relatively constant fuel line pressure and minimum agitation of the fuel.

Accordingly, the present invention deals with a pneumatic booster pump which may be installed at a tank outlet and which is energized either by a light air pressure line running from a small engine driven compressor, or preferably from the pressure side of the engine supercharger, whose pressure, though moderate, is adequate to operate a slow-acting large displacement diaphragm pump. Such pressure will operate the pump automatically to maintain a boosted fuel pressure consistent with supercharger boost and substantially consistent with the altitude at which the aircraft may be operating.

Accordingly, an object of the invention is to provide an air operated booster liquid pump which may be operated remotely from prime movers and which will have a delivery pressure substantially proportional to the amount of pressure available for operating it and a delivery flow only as great as the demand for liquid.

A further object is to provide a pump unit which is readily adapted for attachment to a fuel tank for boosting the outlet fuel pressure from the tank.

A further object is to provide a diaphragm type double-acting pump which will operate at any moderate speed adequate to supply the demand for fluid and which will be of such simplicity of design as to minimize possibilities of failure.

Still another object is to provide a delivery flow compensating device in a double action pump which will maintain delivery flow from the pump at those intervals where the pump mechanism is reversing its stroke, whereat little or no delivery is made by the pump.

A further object of the invention is to provide a snap action air controlled valve which will tend to overcome lag at the ends of the pump stroke, to minimize time lag during which there is little or no fluid delivered by the pump.

Further objects of the invention will be apparent from the annexed detailed description in connection with the drawings, in which.

Figure 1:
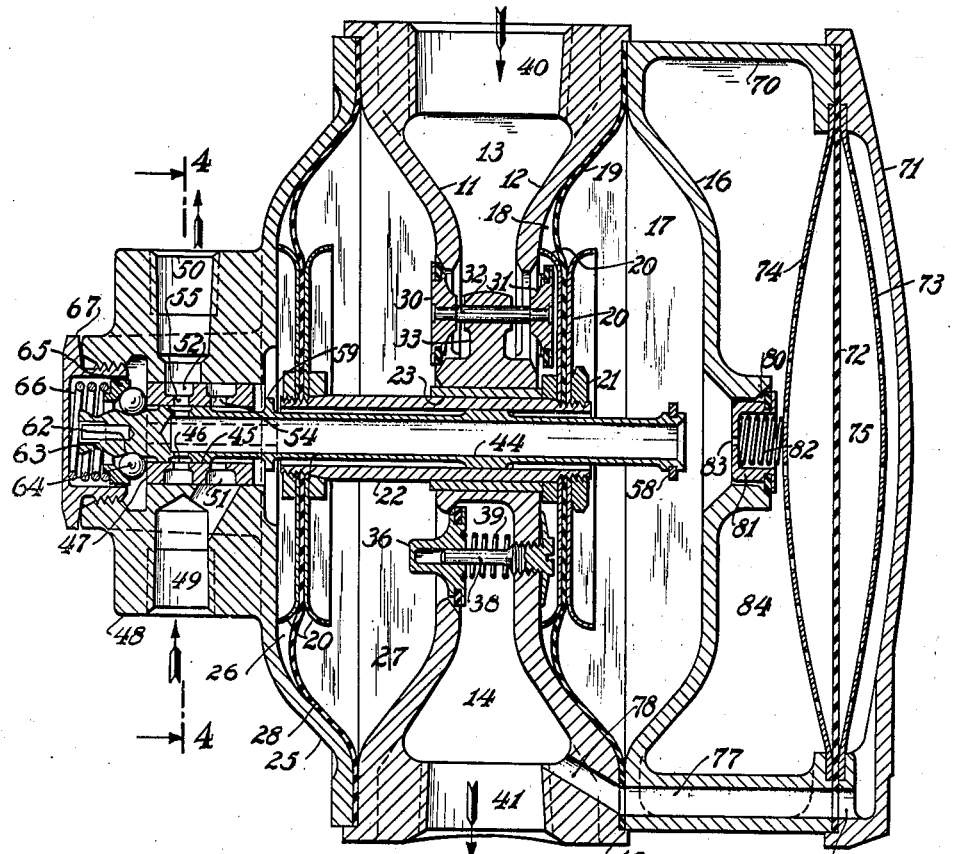
Fig. 1 is a longitudinal section through a pump embodying the principles of the invention and comprising a section on the line 1—1 of Fig. 2.
Figure 5:
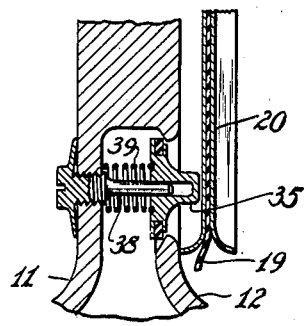
Fig. 5 is a section on the line 5—5 of Fig. 2.

The following description will serve to describe the general construction and functioning of both types of pumps shown in the drawings, the difference between the pump of Fig. 6 and the other embodiment being pointed out subsequently.

The pump consists of a central body portion 10 comprising cupped circular plates 11 and 12 facing away from one another and defining therebetween an intake fuel cavity 13 and an exit fuel cavity 14, said cavities being separated from one another by an integral wall 15. To the right hand plate 12 is secured a facing cupped plate 16 defining therewith a pump chamber divided into a motor cavity 17 and a fuel cavity 18 by a yielding diaphragm 19 secured at its edges between the plates 12 and 16 and secured at its center between metal discs 20 held by a nut 21 upon a reciprocable sleeve 22 axially movable in a bore 23 formed centrally of the member 10.

The left hand plate 11 is provided with a facing plate 25 defining a chamber separated into a motor cavity 26 and a fuel cavity 27 by a yielding diaphragm 28 secured at its edges between the plates 11 and 25 and secured centrally between discs 20 secured to the left hand end of the sleeve 22. The fuel inlet space 13 communicates with the cavities 18 and 27 through check valves 30 and 31 secured to a common stem 32 slidable in a boss 33 forming part of the pump housing. The valves 30 and 31 are reciprocably operable and are automatic in action, as will shortly become apparent. The outlet space 14 communicates with the cavities 18 and 27 through outlet valves 35 and 36, respectively. These valves are identical in construction with one another and comprise elements having central bores piloted upon stems 38 screwed through the opposite plate, each stem 38 being embraced by a light spring 39 tending to hold its valve seated upon its plate. As is apparent from the drawings, the valve 35 seats upon the plate 12, while its stem 38 is carried by the plate 11. The valve 36, on the other hand, seats upon the plate 11 and is piloted by its stem 38 which is secured to the plate 12.

Figure 2:
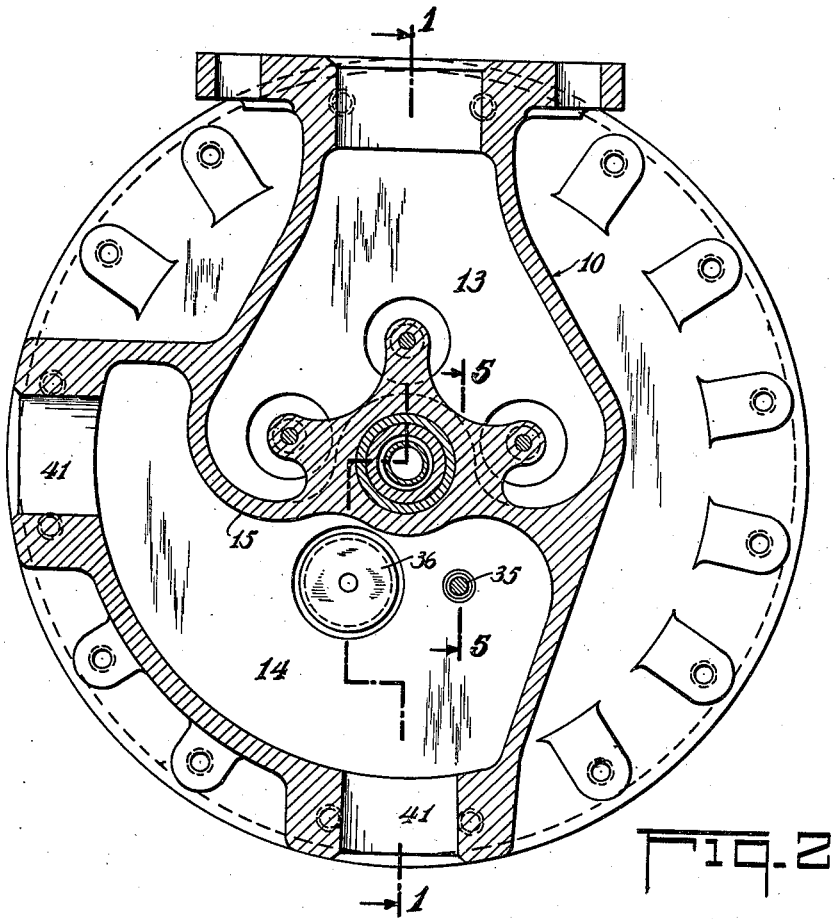
Fig. 2 is a transverse section through a central portion of the pump.
Figure 3:
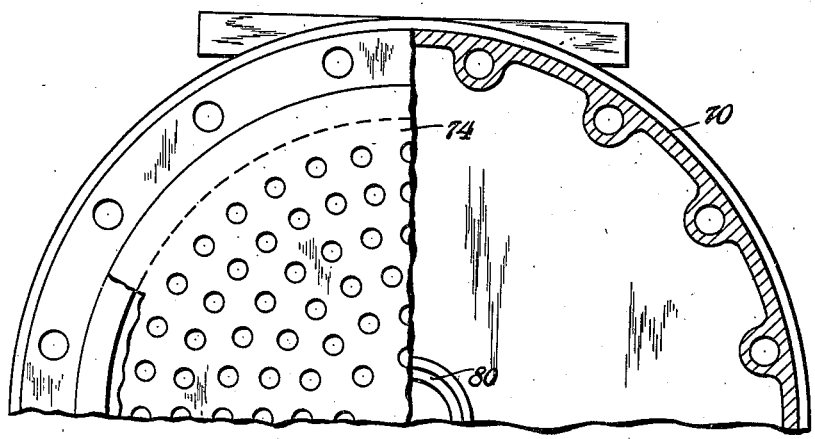
Fig. 3 is a fragmentary transverse section through an end of the pump.

From the structure thus far described, it will be apparent that fuel may enter the space 13 through a fuel inlet opening 40. As the diaphragm sleeve 22 is moved to the right, fuel will be drawn into the space 18 through the valve 31. Concurrently, fuel already in the space 27 will be delivered into the outlet space 14 through the check valve 36. As the sleeve 22 is moved to the left, the valve 31 will close and the valve 30 will open, admitting fuel to the space 27 while that fuel within the space 18 is discharged through the valve 35 into the outlet space 14. The latter is provided with one or more fuel outlet openings 41, as shown in Fig. 2.

Figure 4:
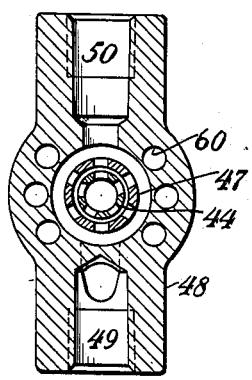
Fig. 4 is a section on the line 4—4 of Fig. 1.

The sleeve 22 is hollow and inserted therein is a tube 44 open at its right hand end to the cavity 17, the tube being sealed within the bore of the sleeve 22 and terminating at its left hand end in a valve part consisting of a portion 45 having a groove 46, the portion 45 being slidable in a ported sleeve 47 fitted to a housing 48 integral with the cover plate 25. Said housing includes an air inlet 49 and an air outlet 50, the former communicating with a groove 51 in the sleeve 47, and the latter communicating with an adjacent groove 52 in the sleeve, said grooves having radial holes 54 and 55, respectively, which communicate with the interior or exterior of the tube 44 according to the axial position thereof. The tube 44 is provided at its right hand end with an annular abutment 58, and toward its left hand end, within the cavity 26, with an annular abutment 59. As is shown in Fig. 4, the housing 48 has one or more drillings 60 establishing communication between the right and left hand ends of the sleeve 47. Thus it will be seen that when the tube 44 is in its left hand position, to which it is moved by leftward movement of the sleeve 22 which will abut at its left hand end upon the abutment 59, communication is established from the right hand pumping cavity 17 through the hollow of the stem 44, through the groove 46, through the holes 55 and groove 52 to the air outlet 50. At the same time, the air inlet 49 communicates through the groove 51 and holes 54 with the pumping cavity 26. With air pressure imposed on the air inlet 49, the air pressure will be led to the cavity 26 and will move both diaphragms 19 and 28 and the sleeve 22 to the right, thereby discharging air within the cavity 17, discharging fuel within the cavity 27, and drawing in fuel into the cavity 18. As the sleeve 22 approaches the right hand end of its stroke, it will come up against the abutment 58 and final movement of the sleeve will shift the tube 44 to change the relationship of the ports in the valve housing 48. In this changed position, the air inlet 49 will connect through the groove 51 and holes 54 with the groove 46 to pass pressure air through the tube 44 to the cavity 17. Concurrently, air in the cavity 26 will pass through the holes 60 (Fig. 4) to the left hand end of the sleeve 47 whereat said air may pass through the holes 55 and the groove 52 to the air outlet 50.

In order to afford a snap-action of the tube 44 which comprises a valve, the left hand end thereof is provided with spaced annular grooves 62 and 63 and a plurality of small balls 64 arranged around the end of the tube, abutting against the left hand end of the sleeve 47 and being resiliently urged thereagainst by an internally chamfered washer 65 urged toward the sleeve 47 by a spring 66 secured by a cap 67 screwed to the housing 48. When axial pressure upon the tube 44 becomes sufficient to spring balls 64 out of whichever groove they may be in, there will be a slight carry-over due to the elastic character of the actuating fluid of the pump, to pass the tube beneath the balls so that the balls will reengage in the other groove. The same action takes place in either direction of movement of the tube 44.

At the right hand end of the pump assembly, as shown in Fig. 1, I provide an auxiliary housing 70 which, as shown, may be integral with the plate 16. This housing carries a cover plate 71 and between the housing and the plate is disposed an elastic diaphragm 72 whose limits of movement are defined by concave perforate plates 73 and 74 also clamped between the housing 70 and the cover 71. Thus, to the right hand side of the diaphragm 72 a bell 75 is defined which communicates with the pump outlet space 14 through passages 76, 77 and 78 formed in the housing elements. The pump end plate 16 is provided with a central opening including a valve seat 80 upon which a check valve 81 is seated, the latter being urged toward a closed position by a spring 82 reacting against the center of the perforate plate 74, said valve having a small vent opening 83 therein. As shown, the valve 81 is arranged to permit pressure air to pass from the pump cavity 17 into the cavity 84 defined within the plate 16, the housing 70 and the diaphragm 72. The cavity 75 will, as the pump operates, be completely filled with fuel and the cavity 84, during pump operation, will carry an average pneumatic pressure slightly less than the maximum pneumatic pressure to which the pump is subjected. This is by reason of the fact that the cavity 17 when subjected to pump driving pressure, during half of its operating time, will open the valve 81 and maintain a corresponding pressure in the cavity 84 during that period. During the other half of its operating time, the cavity 17 will be subject to atmospheric or exhaust pressure, but pressure within the cavity 84 will be maintained except as such pressure is diminished by bleed through the valve orifice 83. When fuel is being delivered to the outlet cavity 14 its pressure thereat will be substantially equal to the pneumatic driving pressure, and will thus tend to deflect the diaphragm 72 to the left. During changes of stroke of the pump, the pump will afford no driving pressure through outlet fuel, so that the reservoir of pneumatic pressure within the cavity 84 will then drive the diaphragm 72 to the right to discharge fuel through the passages 76, 77 and 78 to the pump outlet to maintain pump delivery pressure. So soon as the pump mechanism starts on its opposite stroke, fuel pressure from the pump itself will be re-established in the pump outlet 14 by which the diaphragm 72 will be again deflected to the left until the next change in stroke of the pump mechanism.

Figure 6:
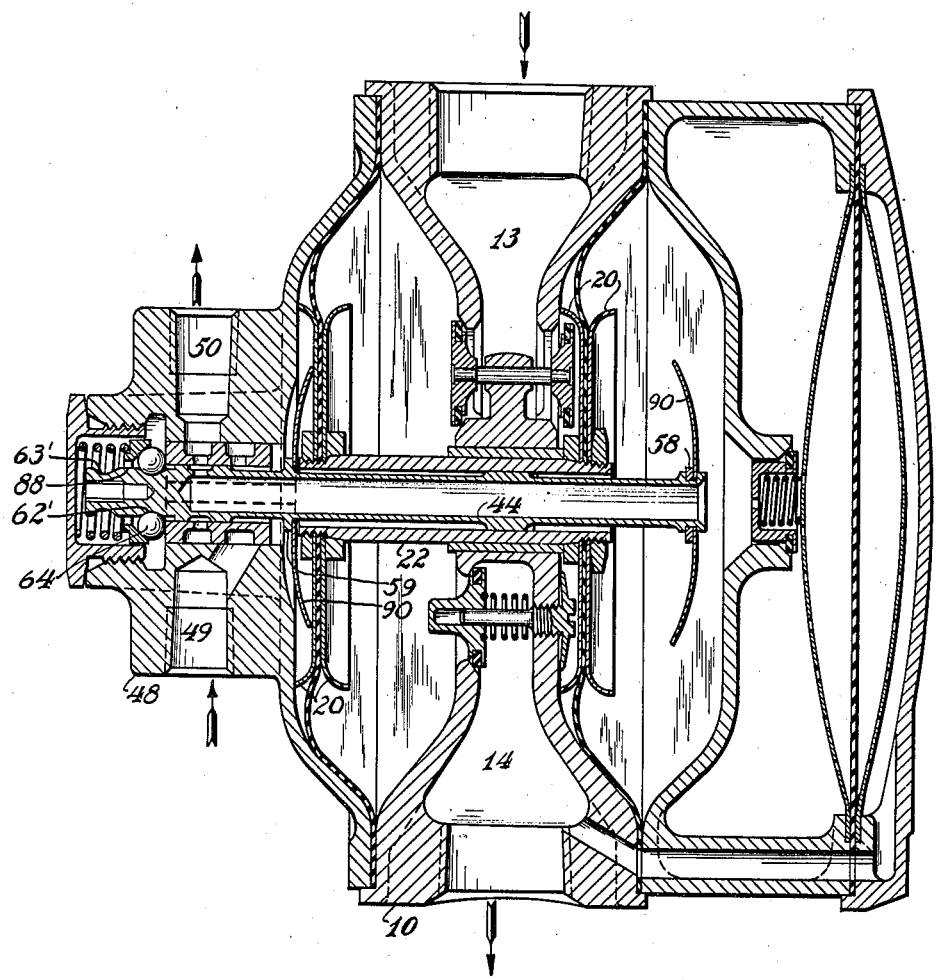
Fig. 6 is a longitudinal section through a pump generally similar to that shown in Fig. 1 but embodying different control provisions.

In Fig. 6, the general provisions of the mechanism are identical with that above described, but an improvement is incorporated to assure switching of the tube 44 to avoid any possibility of the air valve system in the housing 48 hanging on dead center. To this end, the grooves 62' and 63' are slightly spaced apart axially and are provided with an intervening cylindrical portion 88. Adjacent the abutments 58 and 59, one or more inwardly directed spring fingers 90 are secured to the tube 44, these spring fingers extending radially and being so designed as to be touched at their ends by the diaphragm plates 20 before the ends of the sleeve 22 address the abutments 58 and 59. Thus, the spring fingers will be strained a certain amount when the sleeve ends address the abutments 58 and 59 and will store up a small amount of potential energy so that, when the balls 64 release from the groove with which they are engaged, the potential energy in the spring fingers 90 will be used up in shifting the tube 44 with respect to the balls 64, over the flat cylindrical portion 88 adjacent the grooves, until the balls reengage in the other groove. When such reengagement takes place the air valve is set for the opposite direction of reciprocation of the sleeve 22. Other than as described above, the structure shown in Fig. 6 is identical with that shown in Fig. 1, so that reference indicia irrelevant to the above special description are omitted in Fig. 6.

From the foregoing description it will be seen that the pump of this invention tends to maintain constant fluid delivery and substantially constant fluid pressure and requires for its operation only a simple pneumatic tube from a source of air pressure to the pump. It is quite conceivable that fluids other than air may be used for its operation, and when the term pneumatic is used in the foregoing description, it is intended to cover a vacuum system as well as an air pressure system. That is, if the air exit port 50 in the pump be connected to a vacuum supply while atmospheric pressure be connected to the air inlet 49, the pump would be operated by pressure difference between atmospheric and the vacuum and would thus comprise a pneumatic pump.

As before mentioned, it is contemplated that this pump could be fed from the supercharger outlet of an aircraft engine, and if this be done, it will be apparent that the fuel delivery pressure will be substantially equivalent to supercharger outlet pressure, and in any event cannot rise thereabove. This would be desirable where an engine driven fuel pump on the engine picks up fuel delivered by a pneumatic pump. However, it is equally within the scope of the invention to feed the pneumatic pump from a controllable source of high pressure air so that this pump could be utilized to supply engine requirements without an additional engine driven pump in series therewith.

The pump likewise has general utility aside from association with aircraft or aircraft engines, and it is intended that the claims cover a pump of general utility.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination a double-acting pneumatically operated reciprocating fluid pump, means tending to maintain constant fluid delivery during revesals of pump reciprocation comprising a fluid bell connected to the pump delivery, a chamber, an elastic diaphragm separating said bell and chamber, and means to maintain in said chamber an average pneumatic pressure less than the maximum but more than the minimum of the operating pressure present in the pump during its operation.

2. In a double-acting pneumatic reciprocating fluid pump comprising chambers alternately delivering fluid, and chambers alternately subject to pneumatic pressure to effect said delivery, a bell having a yielding diaphragm dividing the bell into two cavities, one of said cavities having constant restricted communication with one of the chambers subject to pneumatic pressure, and means connecting said other cavity with the pump fluid outlet.

3. In a double-acting pneumtaic reciprocating fluid pump comprising chambers alternately delivering fluid, and chambers alternately subject to pneumatic pressure to effect said delivery, a bell having a yielding diaphragm dividing the bell into two cavities, one of said cavities having constant restricted communication with one of the chambers subject to pneumatic pressure, and means connecting said other cavity with the pump fluid outlet, the restricted communication between the one cavity and chamber comprising a check valve allowing relatively free air passage from the chamber to the cavity and relatively restricted air passage in the reverse direction.

4. In a fluid driven liquid pump comprising tandem chambers separated by a wall having fluid inlet and outlet ducts, a yielding diaphragm in each chamber dividing each chamber into two cavities, each inner cavity being connected to said fluid inlet and outlet ducts, a sleeve passing through said wall and secured at its ends to said diaphragms, a member embraced by said sleeve and with respect to which said sleeve is slidable, abutments at spaced apart points on said member adapted to be engaged by the sleeve during reciprocation thereof, and valve means actuated by axial member movement to direct motive fluid to one or the other of the end cavities of said chambers.

5. In a fluid driven liquid pump comprising tandem chambers separated by a wall having fluid inlet and outlet ducts, a yielding diaphragm in each chamber dividing each chamber into two cavities, each inner cavity being connected to said fluid inlet and outlet ducts, a sleeve passing through said wall and secured at its ends to said diaphragms, a member embraced by said sleeve and with respect to which said sleeve is slidable, abutments at spaced apart points on said member adapted to be engaged by the sleeve during reciprocation thereof, valve means actuated by axial member movement to direct motive fluid to one or the other of the end cavities of said chambers, and a spring-pressed detent acting upon said valve means to resiliently hold same in one or the other extreme position of travel.

6. In a fluid driven liquid pump comprising tandem chambers separated by a wall having fluid inlet and outlet ducts, a yielding diaphragm in each chamber dividing each chamber into two cavities, each inner cavity being connected to said fluid inlet and outlet ducts, a sleeve passing through said wall and secured at its ends to said diaphragms, a member embraced by said sleeve and with respect to which said sleeve is slidable, abutments at spaced apart points on said member adapted to be engaged by the sleeve during reciprocation thereof, and valve means actuated by axial member movement to direct motive fluid to one or the other of the end cavities of said chambers, said member comprising a tube providing a conduit for entrance and egress of motive fluid from one of said end cavities.

7. In a double acting reciprocating fluid operated liquid pump, tandem chambers and a wall therebetween, diaphragms in said chamber dividing them into motive fluid and pumped liquid cavities, the liquid cavities lying adjacent said wall, fluid ingress and egress ducts in said wall communicating with said cavities, a sleeve slidably fitted to the wall and secured at its ends to said diaphragms, a tube longer than and fitted within the sleeve one end thereof being open to one of said motive fluid cavities, means on the tube engaged by the sleeve ends by which the tube is moved axially during part of the axial movement of the sleeve, and valve means actuated by tube movement to admit motive fluid alternately to said motive fluid cavities, such fluid passing to one of said cavities through said tube.

8. In a double action pneumatically operated liquid pump, a housing having tandem circular chambers, a yielding diaphragm in each chamber, secured at its edges to the chamber and dividing the latter into an air cavity and a liquid cavity, the liquid cavities of the chambers lying adjacent and the air cavities lying at opposite ends of the housing, a central wall in said housing isolating said chambers from one another and comprising liquid inlet and outlet ducts communicating with the liquid cavities, a sleeve slidable axially through said wall and secured at its ends to said diaphragms, an axially movable member passing through said sleeve having abutments thereon in the air cavities spaced apart a distance greater than the sleeve length and adapted to be alternately engaged and moved by the sleeve ends upon joint movement of the sleeve and diaphragms, and a slide valve at an end of said member movable therewith to direct operating air alternately to one and then the other of said air cavities.

9. In a double action pneumatically operated liquid pump, a housing having tandem circular chambers, a yielding diaphragm in each chamber, secured at its edges to the chamber and dividing the latter into an air cavity and a liquid cavity, the liquid cavities of the chambers lying adjacent and the air cavities lying at opposite ends of the housing, a central wall in said housing isolating said chambers from one another and comprising liquid inlet and outlet ducts communicating with the liquid cavities, a sleeve slidable axially through said wall and secured at its ends to said diaphragms, an axially movable member passing through said sleeve having abutments thereon in the air cavities spaced apart a distance greater than the sleeve length and adapted to be alternately engaged and moved by the sleeve ends upon joint movement of the sleeve and diaphragms, and a slide valve at an end of said member movable therewith to direct operating air alternately to one and then the other of said air cavities, said axially movable member comprising a hollow conduit communicating at one end with said slide valve and at its other end with the air cavity remote from said slide valve.

10. In a double action pneumatically operated liquid pump, a housing having tandem circular chambers, a yielding diaphragm in each chamber, secured at its edges to the chamber and dividing the latter into an air cavity and a liquid cavity, the liquid cavities of the chambers lying adjacent and the air cavities lying at opposite ends of the housing, a central wall in said housing isolating said chambers from one another and comprising liquid inlet and outlet ducts communicating with the liquid cavities, a sleeve slidable axially through said wall and secured at its ends to said diaphragms, an axially movable member passing through said sleeve having abutments thereon in the air cavities spaced apart at distance greater than the sleeve length and adapted to be alternately engaged and moved by the sleeve ends upon joint movement of the sleeve and diaphragms, a slide valve at an end of said member movable therewith to direct operating air alternately to one and then the other of said air cavities, and axially deformable springs carried by said member adjacent each abutment thereof adapted to be engaged and deflected by said diaphragms prior to engagement of said abutments by the ends of said sleeve.

KENNETH A. BROWNE.